United States Patent [19]
Hassan

[11] Patent Number: 5,886,521
[45] Date of Patent: Mar. 23, 1999

[54] DEVICE AND METHOD FOR DETERMINING THE THICKNESS OF AN INSULATING COATING ON AN ELECTRICAL CONDUCTOR OF A CABLE AND THE DIAMETER OF THE CABLE

[75] Inventor: Halil Hassan, Buckinghamshire, United Kingdom

[73] Assignee: Beta Instrument Co. Ltd., United Kingdom

[21] Appl. No.: 819,699

[22] Filed: Mar. 12, 1997

[30] Foreign Application Priority Data

Apr. 12, 1996 [GB] United Kingdom ............... 9607654

[51] Int. Cl.⁶ .............. G01B 7/06; G01R 33/12; G01N 27/72

[52] U.S. Cl. ............................ 324/227; 324/230

[58] Field of Search ...................... 324/230, 226, 324/227, 228, 229, 207.11, 207.26, 262; 356/375, 381; 250/559.19, 559.24, 559.34

[56] References Cited

U.S. PATENT DOCUMENTS 4,977,853  12/1990  Falcoff et al. .................. 324/230

Primary Examiner—Walter E. Snow
Attorney, Agent, or Firm—Baker & Botts, L.L.P.

[57] ABSTRACT

A depth measuring device is used for measuring the depth of insulation on an electric conductor travelling along a predetermined path. The device includes a cylindrical magnetizable core (11) which generates a magnetic field having an axis directed to intersect the path. The core (11) is magnetized by an electric coil (12) coupled to the core (11) and the current drawn by the coil (12) will vary with the distance of the conductor from the core (11) and so provides an indication of the distance of the conductor from the core (11). A laser beam (14) is directed along the axis of the core so as to lie coaxial with the magnetic field. A detector (15) detects light reflected from the outer surface of the insulation and so provides an indication of the distance of the insulation from the core (11). An electrical system subtracts the two measured distances from each other to provide an indication of the insulation thickness.

6 Claims, 4 Drawing Sheets

DEVICE AND METHOD FOR DETERMINING THE THICKNESS OF AN INSULATING COATING ON AN ELECTRICAL CONDUCTOR OF A CABLE AND THE DIAMETER OF THE CABLE

FIELD OF THE INVENTION

The present invention relates to apparatus for measuring the depth of an insulating coating on a conducting medium such as copper, steel, and the like, the insulation being of plastics, rubber or other similar known electrically non-conducting material.

BACKGROUND OF THE INVENTION

It is a requirement in certain processes to have the ability to measure the thickness of the insulating coating on a metallic product in the form of a sheet, rod, wire or the like.

A typical example of such processes is the production of sheet metal work requiring the application of a coating of plastics material to prevent rusting or deterioration of the metallic sheet when used in exposed conditions.

Another well known example is in the production of electrical cables by extrusion techniques. Electrical cables consist of a conductor core made of metallic electrically conducting material coated with a plastics insulating jacket for protective purposes including bodily contact with the live wire.

A convenient method exists for performing the measurement of an insulating coating on an electrically conducting material consisting of a combination of inductive and optical means.

In this system an inductive core is provided with a winding carrying an electrical current. This produces a magnetic field which threads the work product.

The current flowing through the coil of the inductor changes in response to the proximity of the conducting material of the product and this variation can be used to provide constant monitoring of the thickness of the coating.

This prior system is subject to errors created by the distance between the position of interaction of the magnetic flux of the inductor with the conducting material of the product and the position of impingement of the laser beam on the product, and also due to the linear translation of the product in the case of cable extrusion.

SUMMARY OF THE INVENTION

It is an object to the present invention to obviate the disadvantages of the prior art.

According to the invention there is provided a measuring device for determining the thickness of an insulating coating on an electrically conducting substrate such as the insulation coating on the core of an electrical cable formed in an extrusion process comprising electrically inductive means to provide, when energised, an induced magnetic field in the vicinity of the coating, means for detecting variation in the current in said inductive means in response to the proximity of the substrate relative thereto thereby to provide a measure of the position of the substrate beneath the coating, optical detector means for directing a beam of light along the axis of the magnetic field induced by said inductor means onto the surface of the coating and detecting a reflection of the beam from said surface thereby to determine the position of the outer surface of the coating and means for processing the positional measurement of the substrate beneath the coating and that of the outer surface of the coating thereby to determine the thickness of the coating.

Preferably the inductive means is a hollow cylindrical core provided with an inductive winding, the magnetic axis of the core and the beam from the optical detector being coincident.

Other features and advantages of the present invention will become apparent from the following description of a preferred embodiment of the invention.

BRIEF DESCRIPTION OF THE DRAWINGS

The invention will now be described, in preferred detail, with reference to the accompanying drawings, wherein.

PREFERRED EMBODIMENTS OF THE INVENTION

Figure 1:
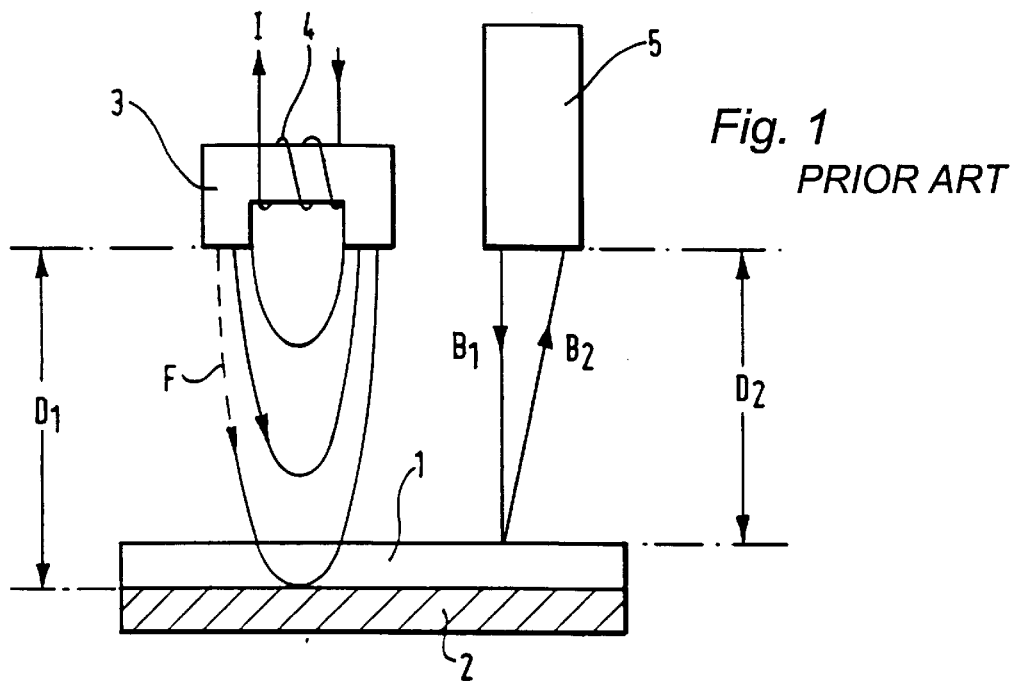
FIG. 1 illustrates a depth measuring device according to the prior art.

In FIG. 1 is a device depicted in accordance with the prior art for determining the thickness of an insulating coating 1 formed on a flat metal sheet 2 as in the production of a sheet metal work product.

This prior device comprises a U-shaped inductive core 3 with an energising coil 4 wound around its central limb.

A current I is passed through the coil 4 which induces a magnetic field F linking the ends of the inductor 3 which latter is positioned such that the magnetic field F threads the coating 1 and metallic sheet 2 of the work product.

The presence of the metallic sheet 2 conditions the current I so that any movement of the sheet 2 in the field F varies the current I through the coil 4. By this means a measure of the distance $D_1$ of the ends of the outer limbs of the inductor 3 from the surface of the metal sheet 2 of the work product can be obtained.

A laser based proximity detector 5 is positioned a distance from the inductor 3 above the work product as shown, to direct a beam $B_1$ upon the surface of the coating. The proximity detector 5 by receiving the optical back scatter from the non-transparent surface of the coating 1 of the work product is able optically to determine the distance $D_2$ of the detector 5 from the coating.

This may be achieved by using a charged coupled device (CCD) as the detector. Thus if the distance $D_2$ between the laser emitter 5 and the surface of the coating 1 changes the position of the back scatter on the pixels of the CCD will change, which positional charge can be related to a measure of the distance $D_2$ using well known processing devices.

By combining the measurements of the inductor 3 and the proximity detector 5 in a suitable calculating device, it will be seen that it is possible to determine the thickness of the insulating coating 1 on the metallic sheet 2, namely the difference $D_1-D_2$.

Figure 2:
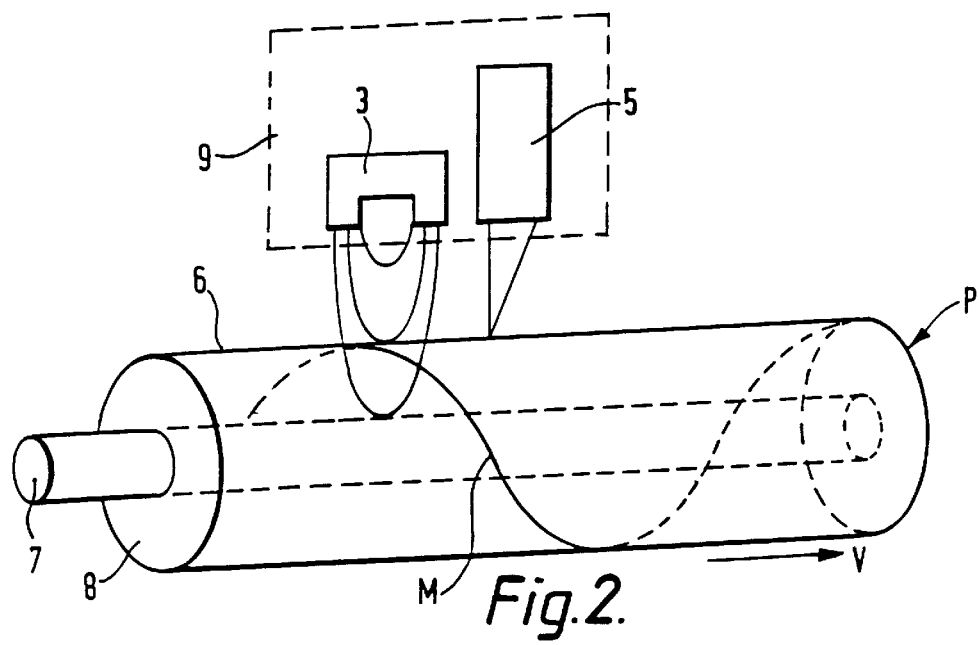
FIG. 2 is the same measuring device as shown in FIG. 1, but used to determine the thickness of a coating of an electrical cable formed in an extrusion process.
Figure 3:
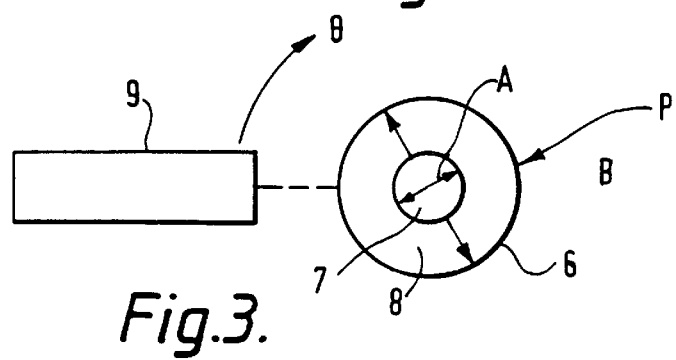
FIG. 3 is an end view of the system depicted in FIG. 2 illustrating how the device can be made to rotate around the extruded cable.

This method can be used not only to measure the coating on a flat sheet as shown in FIG. 1, but also to measure curved surfaces such as an extruded cable as illustrated in FIGS. 2 and 3.

Such products may be stationary or be travelling as, for instance, during a linear production process, and in order to examine and measure the overall thickness of the insulant coating on the core of the cable or conductor, it is possible to rotate a combined and mechanically coupled inductor and laser detector unit of the type shown in FIG. 1 around the moving product so that a measure of depth of insulant may be determined.

Thus, as shown in FIG. 2, the work product P is a cylindrical cable 6 formed of a metal core 7 and an outer insulating coating 8 being manufactured in a linear process such as cable extrusion.

In order to detect the thickness of the insulating coating 8 on a travelling product of this type, the inductor 3 and proximity detector 5 of FIG. 1 are mechanically coupled to form a transducer 9 which can be rotated around the product, to perform a spiral measurement M around the travelling product.

FIG. 3 is an illustration of the rotational movements of the measuring transducer 9 around the cable of FIG. 2.

The process of this measurement may be analysed as follows.

Let:

the linear speed of product P=V the linear distance travelled in time t=L the angular rotation of the transducer 9 in time t=Θ the diameter of core 7=A the diameter of overall cable product P=B the distance between laser and inductor=X the distance of sensing head of the transducer 9 from cable surface=S Due to the fact that the transducer 9 performs two measurements which are at a discrete distance apart, and also because the product P is moving linearly, the transducer 9 is rotating around the product P. In determining the thickness of the coating 8, two basic errors will be introduced, namely:

(1) Error due to the longitudinal movement (2) Error due to the rotational movement The time delay due to sensor displacement $$= \frac{X}{w(D/2 \neq S)} = td$$

The error due to the longitudinal translation of the product approximates to:

$$\left[\left|\frac{dB}{dL}\right| - \left|\frac{dA}{dL}\right|\right] td \cdot V$$

The error in addition to the above due to the rotational movement of the transducer 9 approximates to:

$$\left[\left|\frac{dB}{d\Theta}\right| - \left|\frac{dA}{d\Theta}\right|\right] td$$

The total error due to both linear and rotational translations would be approximate to:

$$td\sqrt{\left(\left|\frac{dB}{dL}\right| - \left|\frac{dA}{dL}\right|\right)^2 V^2 + \left(\left|\frac{dB}{d\Theta}\right| - \left|\frac{dA}{d\Theta}\right|\right)^2}$$

A number of experiments have been performed and it has been found in various examples that the error of the measurement of the thickness of the insulating coating 8 is quite significant as the following table shows:

| mm Cable OD | Cable ID | Measurement error % for different cable oscillation frequency | | |
|---|---|---|---|---|
| | | Cable oscillation = 1 Hz, 10 mm amplitude | Cable oscillation = 1.5 Hz, 10 mm amplitude | Cable oscillation = 2 Hz, 10 mm amplitude |
| 100 | 95 | 2.40% | 3.60% | 4.80% |
| 80 | 75 | 3.00% | 4.50% | 6.00% |
| 60 | 56 | 5.00% | 7.50% | 10.00% |
| 40 | 37 | 10.00% | 15.00% | 20.00% |

In order to eliminate these errors, an inventive method and apparatus is disclosed which will perform the measurement of the thickness of insulating coating material on a metallic material irrespective of shape, position or movement, and which will not be subject to the errors of the prior art.

Figure 4:
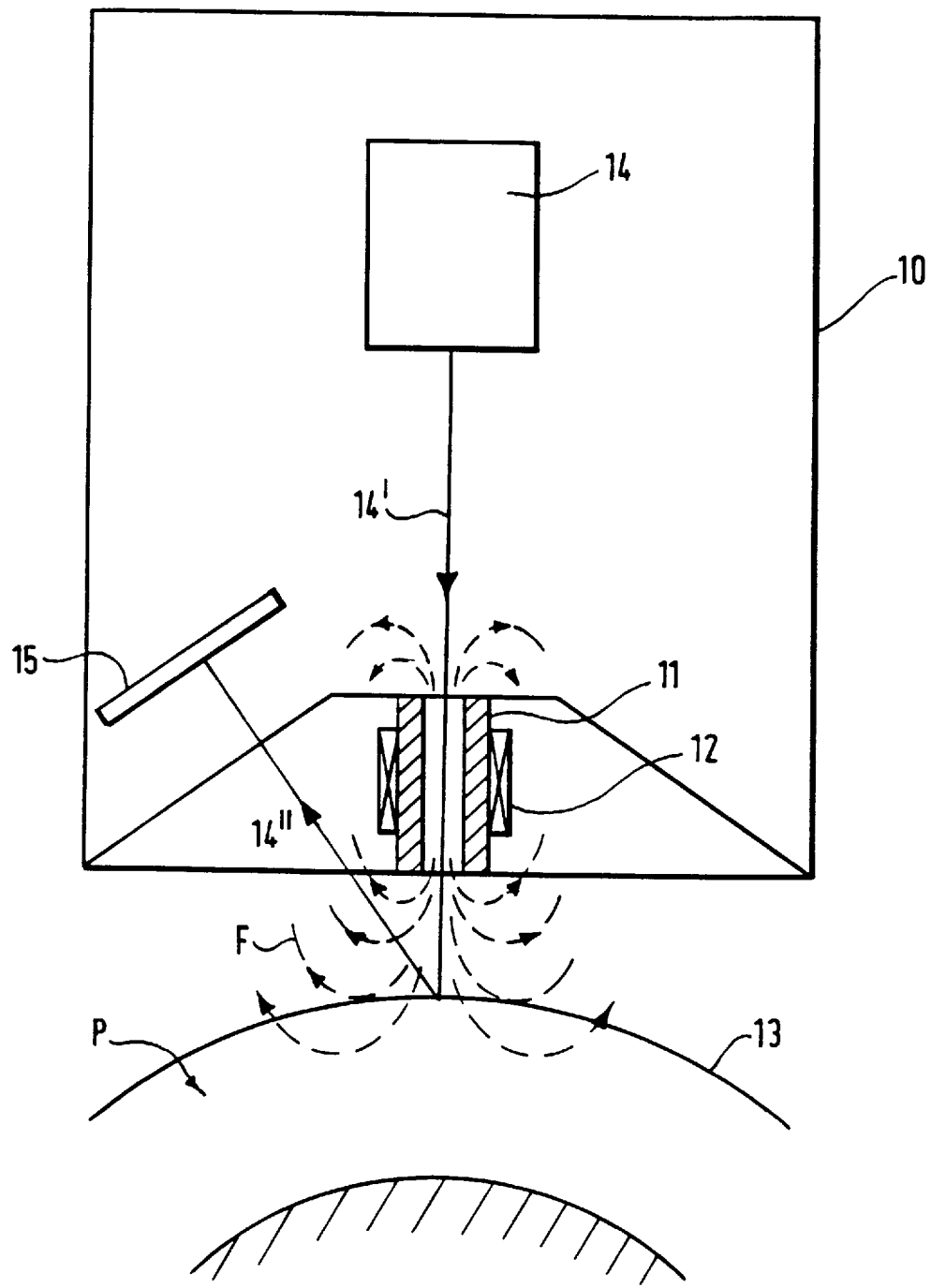
FIG. 4 depicts a measuring system in accordance with an embodiment of the invention.

A measuring device according to an embodiment of the invention is shown in FIG. 4.

The measuring device comprises a measuring head 10 carrying a hollow cylindrical inductor 11 provided with an energising coil 12 which can be mounted with respect to the work product P, in this case a moving cable, such that its axis is normal to the surface 13 of the product P.

A proximity detector 14, preferably laser based, is mounted within the head 10 and, in contrast with the prior art, above the hollow inductor 11 such that the axis of its columnated laser beam 14' lies on the magnetic axis of the hollow inductor 11. The reflected beam 14" from the surface 13 is picked up by a detector 15 mounted in the head 10.

Thus the point of impingement of the beam 14' on the surface 13 is coincident with that of the axis of the magnetic field F generated by the inductor 11. By this means errors that occur due to the separation and also due to the linear translation of the product as explained above, as well as the rotational movement of the transducer 10 comprising the proximity detector 14 and the hollow inductor 11, are eliminated.

It is to be noted here that although the embodiment shown and described herein employs a hollow inductor 11, this is only necessary where an optical beam such as that provided by a laser is used. Thus the inductor could be solid if an X-ray beam or similar were employed so long as the axis of the X-ray beam was coaxial with a magnetic axis of the core of the inductor.

As mentioned earlier, the present invention provides a means of measuring the thickness or depth of an insulating coating which has been extruded or otherwise deposited upon a metallic sheet or core. In particular, in an electric cable extrusion process, the invention affords significant benefits in that it can be employed while the product is being manufactured. Consequently, a control signal can be generated from the measuring transducer, which can be fed back to the extrusion machine in order to control thickness of the insulant being extruded on a continuous basis.

Another significant benefit of this invention is that measurement is effected without contact with the product so that its use to determine coating thickness of products at high temperature is possible.

Figure 5:
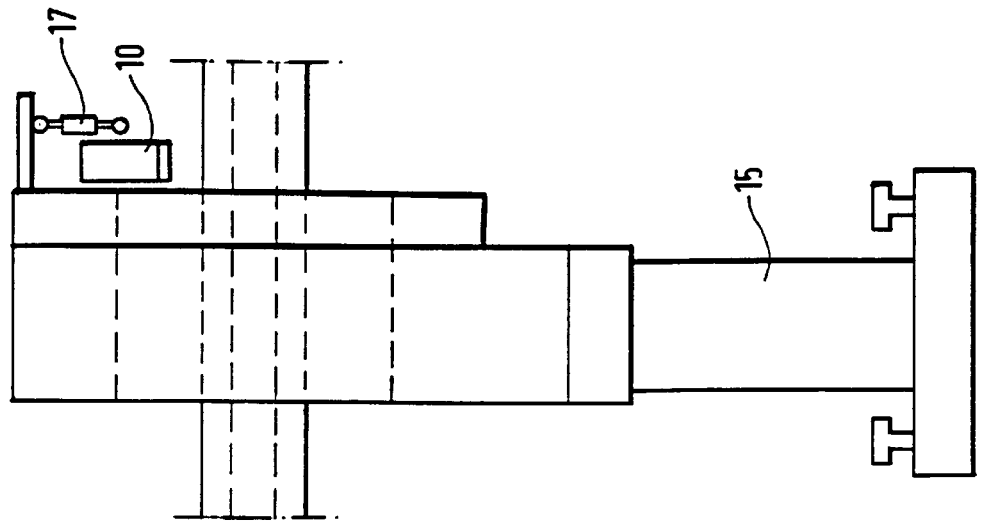
FIG. 5 in front and side view illustrates how the measuring system of FIG. 4 is able translationally to rotate about the product being measured.
Figure 5:
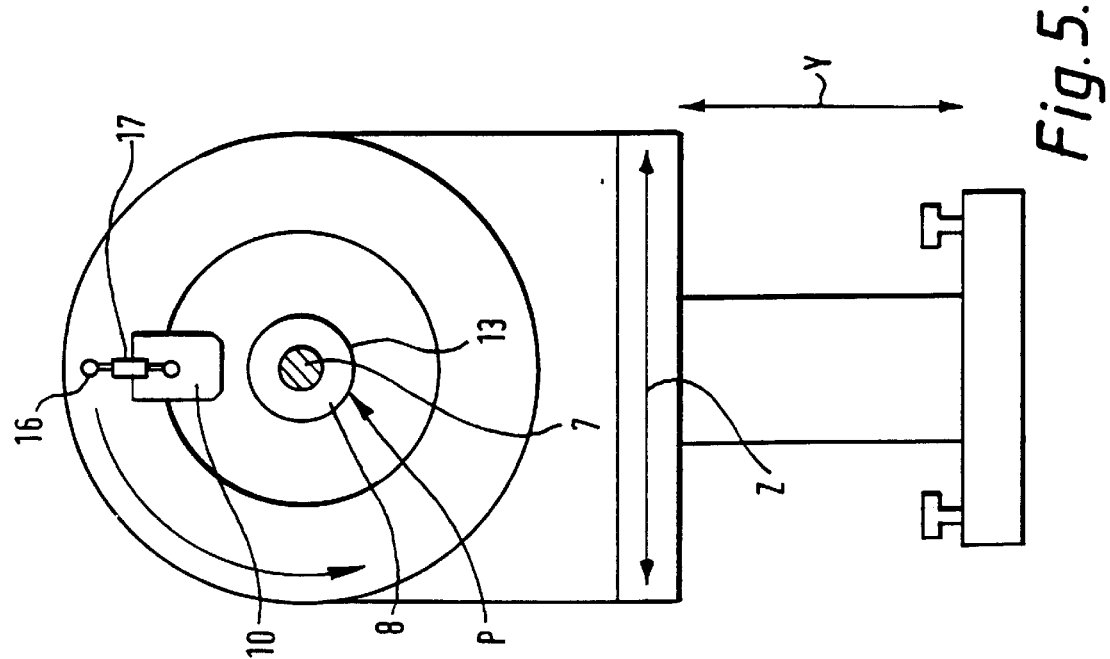
Figure 6:
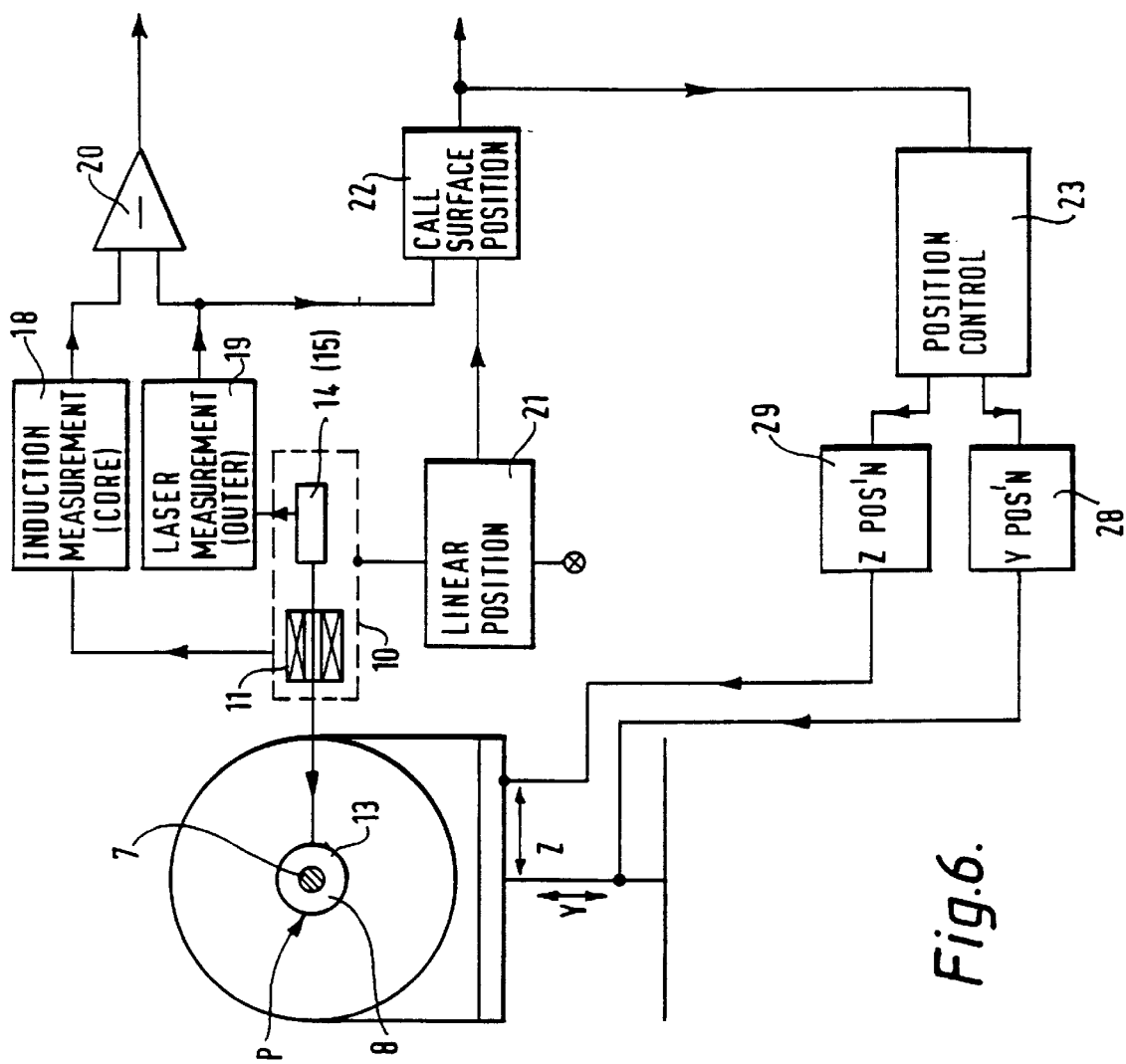
FIG. 6 is a schematic diagram of an electronic system for controlling the arrangement shown in FIG. 5.

With reference now to FIGS. 5 and 6 the measuring transducer 10 of FIG. 4 is shown mounted in a support framework 15 to form a complete measuring head which incorporates systems for aligning the transducer 10 in order that this will be central with the path of the extruded cable. These systems operate in the following manner:

(a) Electronic actuators (not shown) automatically position the measuring transducer head 10 so that it rotates around the centre of the cable P. (Y & Z movement.)

(b) The laser/inductive transducer 10 is then brought down to within a fixed nominal distance of the cable surface 13. The distance of the transducer 10 from a fixed mechanical reference point 16 is measured via a linear position sensor 17.

(c) By taking differential measurements from the laser proximity detector 14 and the inductor 11 of the transducer 10 the insulation thickness 8 of the product P can be measured.

(d) By taking absolute measurements from the laser proximity detector 14 and the linear position sensor 17 the true diameter of the cable product P can also be measured.

FIG. 6 shows a schematic diagram of an electronic system which controls the transducer 10 and positions it centrally to the path of the cable product P to be measured.

In this system, the combined laser/inductive sensor head 10 is mechanically rotated around the cable product P to be measured. For accurate measurement the product P must be situated close to the axis of rotation of the head 10.

The proximity of the conductive core 7 of the cable product P causes a phase shift in the inductive sensor 11 which is filtered and amplified by a module 18 to give a DC output directly proportional to the distance between the surface of the core 7 and the inductive sensor. The proximity of the surface 13 of the indulation layer 8 is measured by the optical sensor 14(15) and filtered DC output produced from module 19.

An electronic comparator 20 is used to process the outputs from modules 18 and 19 to provide an instantaneous measure of the distance between the surface of the core 7 and the surface 13 of the insulation layer 8 (ie insulation thickness).

The insulation wall thickness is independent of the absolute position of the sensor head 10 as it is a differential measurement. However, to calculate the true diameter of the cable product P it is necessary to know the relative position of the sensor head 10. This is achieved by monitoring the output of a linear position transducer 21 which is physically connected to the sensor head 10. The output from the sensor 21 is combined with the output from the wall surface position measurement and fed to electronics module 22. The module 22 calculates the true diameter of the cable and also the position of the cable in space. The cable position signal is passed to module 23 which calculates Y and Z position co-ordinate outputs. The Y and Z position output drive directly to module 28 and 29 which provide the amplified drive signals to zero position motors of the system (not shown) to control the measuring position of the transducer head 10 relative to the central axis of the cable product P.

The embodiments of the invention may be summarised as follows:

Summary 1 A method and apparatus comprising of an inductive element and optical element, (preferably a laser based element) and by mechanically coupling the inductive and laser element to form a transducer the insulating thickness or depth of insulation of a composite product can be measured, which comprises of a metallic part and an insulating non-metallic part bound together.

Summary 2 A system comprising of an inductive element being of tubular construction with a hole or aperture through the middle, which is combined with a laser based distance measuring instrument in such a way so that the emitting laser beam from the laser based instrument travels through the hole or aperture of the inductive tubular element in order that the laser beam and the axis of the magnetic field generated by the inductive element are coincident at the same spot, so that this combined unit can be used to measure the depth or thickness of insulation of a composite product, which is made up of insulating and metallic parts bound together.

Summary 3 A method and apparatus as described above in which a combined inductive and laser based transducer is used to measure the thickness of composite materials which are in sheet or strip form, either stationary or in motion.

Summary 4 A method and apparatus as described above in which an inductor in the form of a tube is mounted mechanically with an element emitting laser beam which travels through the aperture of the tubular inductor in order that the laser beam, as well as the axis of the magnetic field generated by the tubular inductor, is used to measure the insulation thickness of curved, circular or tubular products.

Summary 5 A method and apparatus as described above in which an inductive tubular element and a laser distance measuring unit are combined to form a transducer mounted on a rotating system which rotates around a linear extruded product such as an electric cable, comprising of a metallic conductor and an insulating coating in a process such as extrusion, the transducer thereby having the ability to measure the depth or thickness of insulation being extruded on the metallic conductor and outputting a control signal to the extrusion device, so that the insulation thickness may be maintained constant.

Summary 6 A system and apparatus as described in the above claims which can be used in an extrusion line extruding electric cable continuously, the transducer aligning itself to the correct position automatically around the cable being produced and then continuously rotating about the axis coincident to the travelling direction of the cable, thereby measuring the insulation thickness of the plastic extruded on the cable core as well as the eccentricity of the cable core within the plastic jacket.

Summary 7 A method and apparatus as described in the above summaries in which the transducer rotates around a cable being produced continuously and having been calibrated in such a way so as to give absolute figures of the thickness of the insulation or a percentage of thickness of the metallic core in relation to the outer plastic jacket, as well as giving an absolute readout of the outer diameter of the cable being produced.

Summary 8 A method and apparatus described in the above summaries in which a transducer being inductive and laser based is made to rotate around an electric cable being extruded continuously and a signal from the transducer is fed into a VDU (visual display unit) in order that a pictorial image of the section of the extruded cable can be obtained on a screen.

Given the wide variations of possible modifications which are all within the scope of this concept, one is cautioned not to restrict the invention to the embodiments specifically disclosed and illustrated, but rather encouraged to determine the scope of the invention only with reference to the following claims.

I claim:

1. A measuring device for determining the thickness of an insulating coating on an electrical conductor of a cable and the diameter of the cable as the cable is fed along a predetermined path, comprising electrically inductive means energisable to provide an induced magnetic field having an axis directed towards said path, means for detecting variation in the current in said inductive means when said substrate is fed along said path and having an output which provides a measure of the position of the substrate beneath the coating, radiation means for directing a beam of radiation along the said axis of the magnetic field towards said path so as to impinge on the surface of the coating when passing along said path, second means for detecting a reflection of the beam from said surface and having an output which provides an indication of the position of the outer surface of the coating, processing means for processing the outputs of the first and second means to determine the thickness of the coating, a sensor head arranged for rotation about said path, means mounting said radiation means and said inductive means on said sensor head, a linear position transducer connected to the sensor head and having an output which provides a measure of the distance of the sensor head from said path, and means for combining the positional measurement obtained at the output of the linear position transducer with the indication of the position of the outer surface of the coating obtained at the output of the radiation means as the head rotates so as to calculate the diameter of the cable.

2. A measuring device as claimed in claim 1, wherein the inductive means comprises a hollow cylindrical magnetisable core, an inductive winding, coupling the core, the magnetic axis of the core and the beam from the radiation means being coincident.

3. A measuring device as claimed in claim 1, wherein said combining means provides an output representative of the position of the cable in space to provide signals to a position control monitoring device whereby to maintain the rotational position of the sensor head constant with respect to the central axis of the cable.

4. A measuring device according to claim 1 wherein said radiation means comprises optical means producing a light beam.

5. A measuring device according to claim 4, wherein that said optical means comprises a laser producing a laser beam.

6. A method of determining the thickness of insulation on an electrical conductor of a cable and the diameter of the cable comprising the steps of energising a coil coupled to a cylindrical core of magnetisable material to create a magnetic field having an axis coaxial with the core and intersecting a predetermined path along which the conductor is arranged to travel, measuring the current in the coil to provide an indication of the distance of the conductor from the core, directing radiation along said axis through the core, detecting radiation reflected from the outer surface of the insulation and determining the distance of said outer surface of the insulation, computing from determinations the thickness of said insulation, repeating the measuring, directing and computing steps at successive angularly spaced apart positions about the axis of the core, and calculating the diameter of the cable.

* * * * *